UNITED STATES PATENT OFFICE.

HENRY CARMICHAEL, OF BRUNSWICK, MAINE.

TREATING PAPER-STOCK.

SPECIFICATION forming part of Reissued Letters Patent No. 10,282, dated February 6, 1883.

Original No. 267,492, dated November 14, 1882. Application for reissue filed January 10, 1883.

*To all whom it may concern:*

Be it known that I, HENRY CARMICHAEL, of Brunswick, in the county of Cumberland and State of Maine, have invented a new and useful Improvement in Treating Paper-Stock; and I do hereby declare that the following is a full, clear, and exact description of the same.

My invention is an improvement in articles made of paper or paper-stock—such as paper board, paper boxes, basins, pails, lamps, and like vessels—and in the process of making the same or of rendering the material hard, capable of polish, and proof against the action of water, oils, mild alkalies, and other agencies to which such paper articles or receptacles are exposed, and by which they are liable to injury when in common use.

It is well known that many vessels and receptacles of various kinds and forms are now made of paper, or of ordinary paper or like pulp. Such articles have heretofore been strengthened and waterproofed in various ways by saturation with various substances, but principally by surface-coating of paint or like covering. In all of these the sole object and effect have been to exclude the water or other liquid to which the surfaces are exposed. My object is to improve such articles as the above specified in respect to hardness, strength, capability of polish, and also to render said articles impermeable to all that class of liquids to contact with which they are ordinarily subjected.

To this end my process consists in saturating the aforesaid paper or paper-pulp articles with boiled linseed-oil, or linseed-oil thickened by the known process of agitation in the presence of light and air, and in subjecting the articles so saturated to a high degree of heat, all as hereinafter specified. I prepare the linseed-oil by boiling or by agitation, as aforesaid, until by the escape of the more volatile constituents and by a greater or less extent of oxidation the oil is reduced to a thick semi-liquid mass, which, at ordinary temperature, is of the consistency of cold molasses. Into the oil brought to this condition I immerse the paper or paper-pulp article, whether it be lamp, lamp-cup, basin, pail, or any other of the articles made or which may be made of paper or paper-pulp, said article having first been heated to the highest degree to which it may safely be subjected. This is usually about 270° of Fahrenheit. The oil is kept at the same temperature, or somewhat higher. The article is allowed to remain in the oil a length of time dependent upon the thickness and porosity of the walls or parts thereof; but in no case is it permitted to absorb more of the oil than by the subsequent treatment may be converted into a resinous substance. The time sufficient for ordinary articles—such as mill-boards, basins, and the like—I have found to be from one to ten minutes; but for thicker or more solid articles more time may be required. After the article has been withdrawn from the bath the oil which is upon the surface penetrates the interior. This is a necessary incident of the process, since any film of oil remaining upon or near the surface forms, when the article is subjected to heat, an exterior coating, and prevents the hardening of the oil within the body of the article. For this reason the article should be permitted when in the bath to absorb no more oil than may be converted by the heat or oil into a resinous substance, as stated above. The article is then submitted, in free contact with the air, to a degree of heat sufficient to convert the oil into a resinous solid. The temperature specified above—270° Fahrenheit—has been found well suited to the purpose. A lower temperature may be used, but with inferior results, and the temperature should not reach 280° Fahrenheit, at which point the oil is charred. In twelve hours (more or less) the thickened oil is converted into a solid throughout the interior of the paper or paper-pulp article. To secure the best results I repeat the operation above described. After removing the article from the oven, and while still hot, I plunge it again into the thickened oil bath, allowing it to remain one or two minutes. It is then removed and allowed to drip, after which it is returned to the oven and heated to the same temperature as before. I subject the article to the alternate bath and heat from one to four times, according to the thickness and porosity of the material, the thicker and more porous bodies requiring a greater number of the baths and heatings.

By the treatment above described the porous flexible slightly-elastic paper-stock is converted into a substance capable of resisting the action of water, (hot or cold,) of steam, carbonates of the alkalies, alcohol, or any of the substances to which such vessels are liable to be exposed. The article differs from the japanned or painted articles of paper in this, that the change is not of the surface simply, but throughout the body. Its elasticity is increased, and it can be readily filed, bored, or planed. When broken by violence its fracture is even or conchoidal, resembling that of earthenware. It is sufficiently hard to resist ordinary scratching, takes a good polish, and may be painted, enameled, japanned, or lacquered. The pores are completely filled and the vegetable fibers are thoroughly cemented by the tough elastic resin contained in the oil or produced therefrom.

For greater hardness or toughness various resins and gums—like copal and caoutchouc—may be dissolved and added to the thickened oil without materially changing the general nature of the process or its product. When the liquid has become too thick for penetrating the pores it may be thinned by turpentine or ordinary linseed-oil.

In order to facilitate the induration of the article after it is charged with the linseed-oil, I introduce any of the metallic oxides or other so-called "driers" into the pulp or into the fibrous ware during its formation. The amount of these substances thus introduced into the pulp or ware should be proportioned to the amount of linseed-oil to be absorbed by the article, the proportion required to a given amount of oil being well known.

I may also use hydrostatic or pneumatic pressure to force the thickened oil into the pores of the fibrous material previous to its induration, and I may also use an air-pump to exhaust the air from the fibrous material, or use other well-known means, in order that the hot thickened oil afterward applied may readily penetrate it. The wares or other articles formed of paper or paper-pulp and indurated as described may be covered by wood veneers. By this means artificial boards may be made having the ordinary finished appearance of fine woods and of great strength, arising from the indurated paper or paper-pulp.

I am aware that articles of paper-pulp have been covered either internally or externally with a solidified oil composition applied in a solid or doughy state by pressure, and I hereby disclaim such invention.

The impregnation of fibrous articles of various kinds with oxidizing-oils, or compounds of oxidizing-oils, for rendering them proof against water is an old and familiar process; but I am unaware that by any such process the oil has been brought into such chemical and mechanical condition with the fibrous material as that which results from the herein-described process. An important condition in effecting the desired induration is the preservation of the surface from the oil film which naturally forms when the porous body is painted or soaked with the oil or compound thereof.

Having thus described my invention, what I claim is—

1. The described process of rendering paper or paper-pulp articles hard, tough, and impervious, consisting in first saturating the said article in thickened drying-oil, or oil and gums, at substantially the temperature specified, in such a manner that the surface will be free from an oil film, and then exposing said articles to air and like temperature, as set forth.

2. The process of rendering paper or paper-pulp articles hard, tough, and impervious, consisting in saturating said articles in a hot bath of oil and in freeing the surface from films of oil, and subsequently indurating the saturated articles.

3. The described article of paper or paper-pulp, having its pores filled with hardened linseed-oil or linseed-oil with a proportion of gums, substantially as set forth.

HENRY CARMICHAEL.

In presence of—
F. L. MIDDLETON,
DAVID H. MEAD.